UNITED STATES PATENT OFFICE.

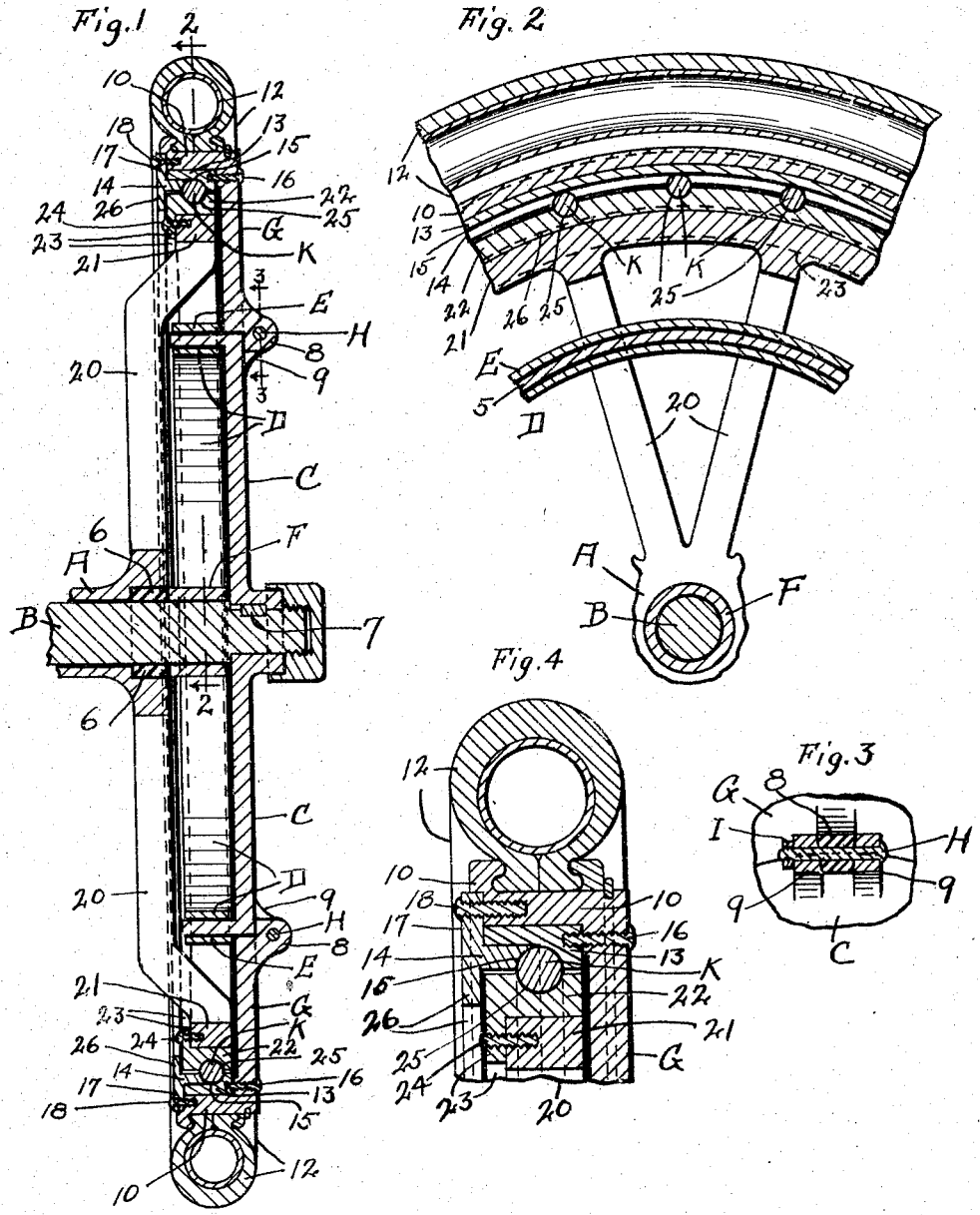

HORACE B. HARVEY, OF CLEVELAND, OHIO.

RUNNING-GEAR FOR AUTOMOBILES.

1,298,204.  Specification of Letters Patent.  Patented Mar. 25, 1919.

Application filed October 27, 1917. Serial No. 198,774.

*To all whom it may concern:*

Be it known that I, HORACE B. HARVEY, a citizen of the United States, residing at Cleveland, in the county of Cuyahoga and State of Ohio, have invented a new and useful Running-Gear for Automobiles, of which the following is a specification.

This invention relates to improvements in running gears for automobiles, and pertains more especially to improvements in the construction and relative arrangement and assemblage of the rear wheels, brake-drums and adjacent non-rotatable portions of an automobile.

The primary object of this invention is to have the non-rotatable part, which is arranged adjacent a rear wheel of the automobile and adapted to be employed in carrying a load-carrying spring of the automobile, mounted internally of said wheel near the outer circumference of the wheel, and to minimize the friction between said wheel and said non-rotatable part.

Another object is to have said wheel and said non-rotatable part so constructed and relatively arranged as to permit of the use of a diametrically large brake-drum, and to have said non-rotatable part so contoured as to accommodate the application of brake-operating shafts and mechanism employed in the actuation of the brake-bands or brake-shoes used in connection with said drum.

Another object is to facilitate the assemblage of the component parts of my improved running gear for automobiles.

With these objects in view, and to attain any other object hereinafter appearing, this invention consists in certain features of construction, and combinations and relative arrangement of the parts, hereinafter described in this specification, pointed out in the claims, and illustrated in the accompanying drawings.

In said drawings, Figure 1 is a central vertical section of a rear automobile wheel and the adjacent non-rotatable part of an automobile, and is illustrative of my improvements in the running gear of an automobile. Fig. 2 is a vertical section taken along the line 2—2, Fig. 1, looking inwardly. Fig. 3 is a section, in detail, taken along the line 3—3, Fig. 1. Fig. 4 shows a portion of Fig. 1 on a larger scale.

Referring to said drawings, A indicates a non-rotatable casing surrounding the rotatable rear axle B of an automobile. Figs. 1 and 2 show an outer end-portion of said axle, and the casing A constitutes a non-rotatable part adapted to be employed in supporting a load-carrying spring of an automobile.

C indicates the head of a brake-drum arranged adjacent the outer end of the illustrated end-portion of the casing A and operatively connected with the axle B in any approved manner. Said brake-drum comprises an annular brake-member 5 formed at the outer circumference of the head C of the drum and projecting laterally of and inwardly from the inner face of said head and arranged concentrically relative to the axle B, and D and E indicate brake-bands or brake-shoes arranged internally and externally respectively of said brake-member of the drum. The bands or shoes D and E are normally loose relative to said brake-member of the drum and adapted to be actuated by any approved mechanism (not shown) into frictional engagement with said member of the drum.

The axle B has bearing in the casing A, and any suitable anti-friction bearings, such, for instance, as rollers 6, are interposed between said casing and the axle, and the brake-drum is shown operatively connected with the axle through the medium of a suitably applied key 7. F indicates a collar loosely mounted on the axle and arranged between the inner face of the head C of the brake-drum and the outer end of the rollers 6.

G indicates an annular section of an annular automobile wheel which is arranged concentrically relative to the axle. The wheel-section G surrounds the head C of the brake-drum and is shown provided, at its outer face and adjacent the outer circumference of said head, with lugs 8 which are spaced equidistantly from and equidistantly circumferentially of the axle B and project outwardly from the outer side of said wheel-section and in the direction of the axle and opposite the outer face of said head. The wheel-section G is arranged concentrically relative to the axle, and the head C of the brake-drum is shown provided, at its outer face adjacent each lug 8 of said wheel-section, with two lugs 9 which project outwardly and in the direction of the outer circumference of the wheel and opposite the outer side of said wheel-section and are arranged next opposite sides respectively of said lug of said wheel-section. Preferably opposing surfaces of said lug 8 and each of said lugs 9 (see Fig. 3) are arranged radially of said wheel-section and radially of said drum, and the shank of a bolt H, which is shown arranged horizontally and at a right angle to the axle, extends loosely through said lugs which are arranged between the head of said bolt and a nut I threaded onto said shank. It will be observed therefore that the wheel-section G, although not mounted on the brake-drum, is rotatably connected with the brake-drum and consequently operatively connected with the axle, and hence the annular automobile wheel illustrated is suitable for use as one of the rear and driven wheels of an automobile.

The wheel-section G is provided at its outer circumference with a laterally and inwardly projecting annual flange 10 which forms the rim of the wheel comprising said section, and said rim is arranged concentrically relative to the axle, and the tire 12 of said wheel surrounds said rim and is applied and secured to said rim in any approved manner.

Preferably said wheel comprises a sectional ring consisting of two annular sections 13 and 14 arranged concentrically relative to the rim 10 and consequently concentrically relative to the axle. Said ring is provided internally with an annular recess 15 arranged concentrically relative to the axle, and the section 13 of said ring is shown arranged next internally of the rim 10 and secured, removably by screws 16, to the wheel-section G. The ring-sections 13 and 14 are contoured as required to form opposite side walls respectively of the recess 15. Preferably the ring-section 13 forms the inwardly facing outer side wall of the recess 15, and the ring-section 14 forms the outwardly facing inner side wall of said recess and is provided externally with a circumferentially extending flange 17 which overlaps the inwardly facing edge of the wheel-rim 10 to which said flange is removably secured by screws 18.

The axle-casing A of the non-rotatable part of my improved running gear is provided, adjacent the inner end and externally of the brake-drum, with substantially radially arranged arms 20 spaced equidistantly circumferentially of said casing, and consequently spaced equidistantly circumferentially of the axle, and the spaces between the arms 20 accommodate the application and operation of brake-operating shafts and mechanism (not shown) for actuating the brake-bands or brake-shoes D and E into braking engagement with the brake-member 5 of the drum. The arms 20, adjacent said member 5 of the brake-drum, have their outer end-portions projecting outwardly at the outer side of the outer brake-band or brake-shoe E and terminating in an annular rim 21 which surrounds said drum and is spaced far enough from the brake-member 5 of the drum to accommodate the location and operation of said band or shoe between said member of the drum and said rim. The rim 21 is arranged concentrically relative to the axle and connects the arms 20 together at their outer ends. The arms 20 and the rim 21 form a non-rotatable circular frame which is rigid with the axle-casing A and arranged concentrically relative to the axle. The rim 21 of said circular frame is surrounded by a non-rotatable ring 22 which is arranged concentrically relative to said rim. The ring 22 is arranged internally of and somewhat spaced from the ring composed of the sections 13 and 14. The ring 22 is provided internally with an annular flange 23 projecting in the direction of the axle and overlapping the inwardly facing edge of the rim 21 and secured, removably by screws 24, to said rim. It will be observed therefore that the ring 22 is rigid with the axle-casing A. The ring 22 is provided externally and opposite the recess 15 in the sectional surrounding ring with segmentally spherical cavities 25 spaced equidistantly from and equidistantly circumferentially of the axle, and each cavity 25 is engaged by an anti-friction ball K which engages said recess. The anti-friction bearings K are therefore interposed between and space apart said rings. The ring 22 has its inner edge overlapped by an annular flange 26 formed on and internally of the section 14 of the aforesaid sectional ring. It will be observed that the wheel-rim 10 overlaps the outer circumferential edge of the outer flange 17 of the section 14 of said sectional ring, and that the inner flange 26 of said ring-section and the wheel-section G form guards arranged to participate in the exclusion of dirt, dust and water from the anti-friction bearings K.

By the construction hereinbefore described it will be observed that the anti-friction bearings K are arranged in proximity to the tire or outer circumference of the wheel, and that the non-rotatable circular frame comprising the members 20 and 21 is therefore mounted in said wheel considerably farther from the axle than from the tire of the wheel. The construction, in detail, of my improved running gear will largely depend upon the use to be made of the automobile, and the type of anti-friction bearings employed is immaterial so far as concerns my present invention. Although the relative arrangement of the brake-drum, the annular wheel, the anti-friction bearings, and the adjacent portion of the non-rotatable part of the automobile, as hereinbefore described, are not unimportant, I would have it understood that my invention broadly involves such a relative arrangement of the parts that the anti-friction bearings K between an automobile wheel and the adjacent non-rotatable frame or portion of the automobile are arranged farther from the axle than from the wheel-tire.

What I claim is—

1. In a running gear for an automobile, the combination, with an axle, an annular wheel which surrounds an end portion of the axle and is provided at its outer circumference with a laterally and inwardly projecting annular rim arranged concentrically relative to the axle, said wheel being provided internally of said rim with a ring which is internally provided with an annular recess, said ring and its recess and the aforesaid rim being concentric relative to the axle, and the ring being composed of two sections forming opposite side walls respectively of said recess, of a non-rotatable ring which is concentric relative to the axle and arranged internally of the first-mentioned ring and provided externally with circumferentially spaced cavities, and anti-friction bearings engaging said cavities and the aforesaid recess.

2. In a running gear for an automobile, the combination, with an axle, a wheel comprising an annular section surrounding an end portion of the axle and provided at its outer circumference with a laterally and inwardly projecting annular flange which forms a rim which is concentric relative to the axle, and a ring arranged internally of said rim and provided internally with an annular recess which is concentric relative to the axle, said ring being composed of two sections forming opposite side walls respectively of said recess, the ring-section forming the outer side wall of said recess being removably secured to the aforesaid flanged section of the wheel, and the other section of said ring being provided externally with a flange which overlaps the inwardly facing edge of and is secured to the aforesaid rim and having an annular flange arranged concentrically relative to and projecting toward the axle, of a non-rotatable ring which is concentric relative to the axle and interposed between the last-mentioned flange and the first-mentioned section of the wheel and provided externally with cavities spaced circumferentially of the ring, and anti-friction bearings engaging said cavities and the aforesaid recess.

3. In a running gear for an automobile, a rotatable rear axle, a brake-drum which surrounds the axle, a non-rotatable part adapted to be employed in supporting a load-carrying spring of the automobile and having a portion thereof extending circumferentially of and spaced from said drum, a wheel having a portion thereof extending circumferentially of and spaced from the said portion of said non-rotatable part, and anti-friction bearings interposed between said portion of said wheel and said portion of said non-rotatable part, said portion of said non-rotatable part and said portion of the wheel being arranged concentrically relative to the axle, and the wheel and brake-drum being operatively connected with the axle.

4. In a running gear for an automobile, a rotatable rear axle, a brake-drum surrounding and arranged concentrically relative to the axle, a casing surrounding the axle and provided externally at the inner end of the brake-drum with outwardly projecting and substantially radially arranged arms spaced circumferentially of the axle and terminating at their outer ends in an annular rim which is concentric relative to the axle, a wheel having a portion surrounding and spaced from said rim, and anti-friction bearings arranged between said rim of said non-rotatable part and said portion of the wheel, said portion of said wheel and said rim being arranged concentrically relative to the axle, and the brake-drum and said wheel being operatively connected with the axle.

5. In a running gear for an automobile, a rotatable rear axle, a brake-drum surrounding and arranged concentrically relative to the axle, a non-rotatable ring surrounding and spaced from the brake-drum and arranged concentrically relative to the axle, a wheel arranged concentrically relative to the axle and provided with a ring surrounding and arranged concentrically relative to said non-rotatable ring, and anti-friction bearings interposed between said rings, the wheel and the brake-drum being operatively connected with the axle.

6. In a running gear for an automobile, a rotatable rear axle, an annular wheel arranged concentrically relative to the axle, a brake-drum arranged internally of said wheel and operatively connected with and arranged concentrically relative to the axle, a non-rotatable part adapted to be employed in supporting a load-carrying spring of the automobile and having a portion thereof surrounding and arranged concentrically relative to the brake-drum, the wheel having a portion thereof surrounding and spaced from said drum-surrounding portion of said non-rotatable part and being rotatable with the brake-drum, and anti-friction bearings interposed between said portion of said non-rotatable part and said portion of said wheel.

7. In a running gear for an automobile, a rotatable rear axle, a brake-drum having a head surrounding and operatively connected with the axle and comprising an annular brake-member which is arranged concentrically relative to the axle and projects laterally and inwardly from the inner face of said head, an annular wheel having a section which surrounds said head and is concentric relative to the brake-drum and has a laterally and inwardly projecting annular flange forming a rim which is arranged concentrically relative to the axle, and a non-rotatable part adapted to be employed in supporting a load-carrying spring of the automobile and comprising a brake-drum-surrounding member arranged internally of the aforesaid rim, anti-friction bearings arranged between said rim and the outer circumferential surface of said drum-surrounding member of said non-rotatable part, and such an operative connection between the wheel and the brake-drum that the wheel rotates with the drum during rotation of the axle.

In testimony whereof, I sign the foregoing specification, in the presence of two witnesses.

HORACE B. HARVEY.

Witnesses:
CASPER J. DOVER,
EMIL W. KRYZ.

Copies of this patent may be obtained for five cents each, by addressing the "Commissioner of Patents, Washington, D. C."